United States Patent Office 3,446,028
Patented May 27, 1969

3,446,028
IN-TRANSIT LIQUEFIED GAS REFRIGERATION SYSTEM
James B. Wulf, Williamsville, N.Y., assignor to Union Carbide Corporation, a corporation of New York
Continuation-in-part of application Ser. No. 587,314, Oct. 17, 1966. This application July 11, 1968, Ser. No. 747,023
Int. Cl. B60h 3/04; F17c 7/02
U.S. Cl. 62—45
15 Claims

ABSTRACT OF THE DISCLOSURE

A system for refrigerating perishable products in which low boiling liquefied gas is provided, partially vaporized to form a liquid-vapor mixture containing at least 8% vapor and sprayed as discrete streams into the product storage chamber for uniform cooling.

---

This application is a continuation-in-part of application Ser. No. 587,314 filed Oct. 17, 1966, now abandoned. This invention relates to a method of and apparatus for the refrigeration of perishable products, and more specifically to a mobile liquefied-gas refrigeration system for food products.

Until recently, preservation of perishable food products by in-transit refrigeration has been accomplished by inefficient and expensive systems. The high costs associated with inefficient preservation systems have been passed on to the consumer of food products. Moreover, in some instances the consumer has received a substandard product due either to inadequate refrigeration or freeze damage.

For example, the most widely used in-transit refrigeration system employs a closed refrigeration circuit in which a refrigerant fluid is circulated through coils and air is blown across the coils by a fan. The vaporized refrigerant is pressurized, cooled, condensed, expanded and recirculated through the coils in a continuous flow manner. Among the limitations of this closed cycle refrigeration system are the need for external power, mechanical complexity and limited as well as slow refrigeration cool-down capability.

These drawbacks have been avoided by the relatively new in-transit refrigeration system in which a low boiling liquefied gas is stored in a container as liquid and discharged in liquid spray form through openings in an overhead conduit into the food storage chamber. This liquid spray system eliminates the external power requirement, can provide large and variable refrigeration capacity, and for many applications has only one moving part—the liquid discharge valve. Accordingly, it has enjoyed remarkable commercial success and is extensively used on trucks, trailers and railway cars for in-transit nitrogen refrigeration and atmosphere control of a wide variety of perishable foods including fruits, vegetables, meat and frozen commodities.

One problem encountered in the use of this liquid spray in-transit refrigeration system is the difficulty in obtaining uniform temperature through the entire perishable food storage chamber. Normally the chamber is horizontally aligned in the longitudinal end-to-end direction and the refrigerant liquid is dispensed as spray through spaced holes in an overhead conduit. The liquid spray absorbs the heat within the storage chamber by utilizing its latent heat of vaporization and sensible heat as the cold gas warms to the storage chamber temperature.

It has been standard practice to control the quantity of refrigeration supplied to the various horizontally aligned zones of the chamber by varying the spacings between adjacent spray holes in the overhead conduit. It was also recognized that the vapor portion increases from the inlet to the discharge end of the overhead conduit, with the inlet usually at the front end of chamber and the access doors usually at the chamber rear end. Under these circumstances the hole spacings were smaller at the rear end than at the front end, to introduce more liquid refrigerant and thus more refrigeration in the rear where presumably the heat load was greatest.

However, it was found that under many conditions such spray hole spacings did not provide uniform temperatures throughout the entire food storage chamber needed for ideal in-transit refrigeration. The importance of uniform temperatures of course varies somewhat with the type of perishable to be refrigerated, but is especially advantageous with certain foods that require refrigeration over a narrow temperature range to avoid excessive deterioration and yet cannot be frozen. For example, in the "long-haul" service needed for shipping fresh produce from the western or southern growing areas to the eastern market region, the storage chamber temperature must be maintained above about 32° F. to prevent freeze damage and below about 45° F. for up to 5 days shipping duration.

An object of this invention is to provide an improved method of and apparatus for the in-transit refrigeration of perishable commodities.

Another object is to provide such method and apparatus in which liquefied gas is sprayed in a perishable product storage chamber under conditions such that the entire chamber is maintained at a substantially uniform predetermined temperature for an extended period.

These and other objects will be made apparent from the ensuing disclosure, appended claims and drawings in which:

I have discovered that the above objects may be realized by vaporizing sufficient low boiling liquid to form a liquid-vapor mixture containing between about 8% and 50% vapor by weight which is then sprayed into the storage chamber. This discovery is based on the recognition that the density of low boiling liquefied gases in the overhead spray conduit of the conventional liquid spray in-transit refrigeration system varies considerably, both in terms of operating time for any particular point between the inlet and discharge ends, and at various points along the conduit. This density difference in large part accounts for the undesired temperature differences in the various sections or zones of the storage chamber. That is, some vaporization occurs in the overhead spray conduit due to heat inleak from the environment, and the degre of vaporization and the fluid density within the spray conduit varis considerably if the fluid supplied to the inlet end of the conduit is 100% liquid. Thus, the fluid sprayed through the conduit openings at the conduit inlet end usually has a higher density and contains substantially more refrigeration than the fluid mixture sprayed through the conduit openings at the opposite end, because the latter may comprise a larger percentage vapor and has lost a substantial portion of its refrigeration capacity.

Figure 1:
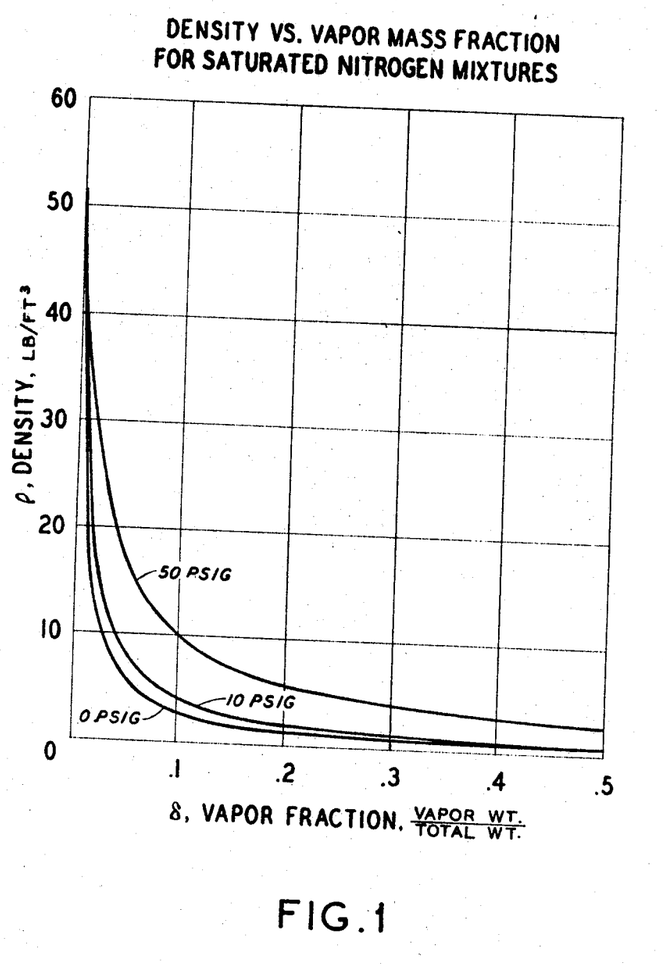
FIG. 1 is a graph showing the relationship between the density of a liquid-gas nitrogen mixture as the ordinate plotted against the vapor mass fraction of the total fluid mass.

With 100% liquid supplied to the overhead spray conduit, I have found that it is virtually impossible to provide a low boiling liquefied gas spray system which will maintain the storage chamber at a substantially uniform predetermined temperature below ambient under all typical in-transit conditions. The same is true if only a small quantity of vaporization occurs upstream of the spray conduit, so that the fluid passed to this spray conduit in the conventional liquid nitrogen spray system may contain as much as 3% vapor. This temperature uniformity problem is in large part due to the great variation in fluid density which occurs between 0% vapor and about 8% vapor fractions, as illustrated in FIG. 1. Although the curves of FIG. 1 are for saturated liquid-gas nitrogen mixture at 0 p.s.i.g., 10 p.s.i.g. and 50 p.s.i.g., they are typical of the general contours experienced with other low boiling liquefied gases as for example liquid air, oxygen, argon, carbon dioxide and helium. The curves are also typical contours for these low-boiling liquefied gases at pressures normally employed and suitable for in-transit refrigeration systems. For example, the density of saturated liquid nitrogen at 0 p.s.i.g. is about 50.5 lbs./ft.$^3$ whereas only 8% vaporization reduces the fluid density to only about 3.5 lbs./ft.$^3$.

Another reason why it has been impossible to realize a substantially uniform refrigeration temperature in the storage chamber is that the system must be designed for a varying heat load pattern. The heat load varies considerably in different zones of the chamber due to different heat inleak patterns caused by ambient temperature and air infiltration, as well as the variations in the heat load contributed by the respiration of various types of perishables. Some varieties of produce respire more than others, and of course it is desirable to provide a refrigeration system suitable for virtually any type of perishable commodity.

Still another cause of non-uniform temperatures in the storage chamber is that the two-phase flow in the overhead spray conduit causes drastic density change and a degree of pressure drop. The greater quantity of liquid sprayed through holes at the conduit inlet end under slightly greater pressure is also more widely dispersed in the chamber and thus more effective in cooling the storage space uniformly than the smaller quantity of liquid-vapor mixture sprayed into the opposite end of the chamber.

By vaporizing sufficient liquid to provide a liquid vapor mixture containing between 8% and 50% vapor and spraying the resulting liquid-vapor mixture through the overhead conduit spaced openings, it is possible to maintain the chamber at substantially uniform temperature. This is because the liquid-vapor mixture assumes a relatively constant density throughout the entire length of the overhead conduit; only a minor amount of additional vaporization occurs between the inlet and opposite ends of the spray conduit. For example again referring to FIG. 1, assume an 8% vapor-containing nitrogen fluid at 10 p.s.i.g. is introduced at the overhead conduit inlet end with a 5 lb./ft.$^3$ density and partially sprayed through openings at this end. The fluid mixture sprayed through openings at the opposite end of this overhead conduit may contain only about 11% vapor and thus have a density of 4 lbs./ft.$^3$. This relatively small density change through the spray conduit allows a substantially constant proportion of liquid-vapor mixture to be discharged as spray through the holes along the entire length of the overhead conduit.

More specifically one aspect of this invention relates to a method for the in-transit preservation of perishable products, in which a pressurized low-boiling liquefied gas is provided having a boiling point at atmospheric pressure below $-20°$ F. in a mobile thermally insulated container. The latter is associated with a mobile thermally insulated storage chamber enclosing a series of horizontally spaced zones extending the chamber length, with adjacent zones contiguously associated with each other including a middle zone and end zones. Pressurized liquefied gas is controllably dispensed from the container and a sufficient portion of the dispensed liquid is vaporized to form a liquid-vapor mixture containing between about 8% and 50% vapor by weight. This liquid-vapor at above atmospheric pressure is sprayed as a multiplicity of discrete streams into each of the storage chamber zones so as to uniformly cool the zones and maintain the entire chamber in a selected uniform temperature range below ambient.

It should be understood that the above-described method refers to a normal state of cyclic equilibrium conditions and not to transitory conditions during the initial cool-down period. After the perishable product has been loaded into the storage chamber, the refrigeration system is placed in service and during the initial operating period all of the dispensed liquid may be vaporized in the overhead conduit. Thus, during this short transitory period a high vapor fraction-low density fluid is discharged through the spray openings. As the overhead spray conduit and connecting piping from the storage container cools, the vapor fraction decreases and the fluid density increases. Eventually the system is cooled to a level at which the various components assume relatively constant temperatures and the portion of liquid vaporized upstream of the overhead conduit is stabilized. It is under these latter conditions that my invention requires liquid-vapor containing between about 8% and 50% vapor by weight.

The percent prevaporization occurring before spraying the fluid into the storage chamber according to this invention may vary considerably, due to changing operating conditions such as the ambient temperature and the desired storage chamber temperature. For example, a particular embodiment of my system having a certain heat transfer area upstream of the spray conduit may operate under high refrigeration load conditions, such as maintaining a low storage temperature ($-20°$ F.) with high ambient temperature (100° F.). Under these circumstances the liquid will be frequently discharged from the container and the percent refrigerant vapor formed upstream of the spray conduit will be relatively low, e.g. 8% vapor, because the feed conduit and spray conduit remain cold between the "on" cycles. However, if the same system is lightly loaded such as by maintaining relatively high storage chamber temperature (40° F.) at low ambient temperature (50° F.), the liquid refrigerant will be only infrequently discharged from the container. Under these conditions the feed and spray conduits warm up considerably between the "on" cycles and the percent vaporization in the feed tube may unavoidably approach 50%. Thus, the maximum percent prevaporization encountered for a particular refrigeration system according to my invention depends principally on the desired storage chamber temperature, the outside ambient temperature, and the quality of insulation used for the storage chamber.

It will be appreciated that the invention requires at least 8% prevaporization to avoid excessive density change in the overhead spray conduit and resultant non-uniform cooling of the storage chamber. On the other hand the prevaporization of the sprayed refrigerant must not exceed about 50% so as to avoid less efficient recovery of the liquid's latent heat of vaporization.

The liquid may for example be partially vaporized by heat from the storage chamber environment, by throttling from a first higher super-atmospheric pressure to a second lower superatmospheric pressure, or by a combination of these methods.

A preferred embodiment of this invention deals with the relative distribution of the aforedescribed liquid-vapor in the storage chamber. I have unexpectedly found that even more uniform temperature patterns within the storage chamber may be achieved by introducing the liquid-vapor as discrete spray streams in greater flow rate per unit length of chamber in the end zones than the middle zone of the storage chamber. This is because the heat loads in the chamber are greater at the opposite end zones; the heat load is lowest in the chamber middle zone. For a relatively tight storage chamber this is true irrespective of where the chamber access means are located. For example, in a truck semi-trailer used as the perishable product storage chamber, the access doors are usually located at the rear end remote from the tractor and the liquefied gas storage container is usually positioned within the trailer at the front end thereof. Despite the periodic opening of the doors at the rear end and the cooling effect of the low temperature storage container and associated cold piping at the front end of the chamber, the heat load at each end is somewhat greater than in the middle portion. As another illustration, consider the ordinary refrigerated railway box car having access doors in the chamber middle zone and the liquid storage container at one end. Again in this assembly I have found that the heat loads are greater in the end zones and less in the middle zone despite periodic exposure of the latter directly to the surrounding environment.

I believe the principal reason for this phenomenon is that the chamber end zones have additional surface area which the middle zone lacks. These surfaces areas admit substantial quantities of heat from the surrounding environment despite the use of thermal insulation in the storage chamber walls. This continuous heat inleak is usually much greater in quantity than the heat introduced around cracks in the access means no matter where the latter is located. The end surface area heat inleak is sufficient to provide a major influence in the heat load distribution within the storage chamber.

It should be understood that as the terms are used herein, the two end zones or sections and the middle zone are not necessarily of equal lengths but the middle zone is always situated between the end zones. Also, in the aforedescribed preferred embodiment, the flow rates of refrigerant introduced in the end zones are not necessarily the same but always greater than the flow rate into the middle zone. In actual practice, the refrigerant flow rate into the end zone farthest from the spray conduit inlet is preferably greater than the rate into the zone closest to the fluid inlet. This is because the latter contains less vapor and consequently has greater cooling capacity.

Figure 2:
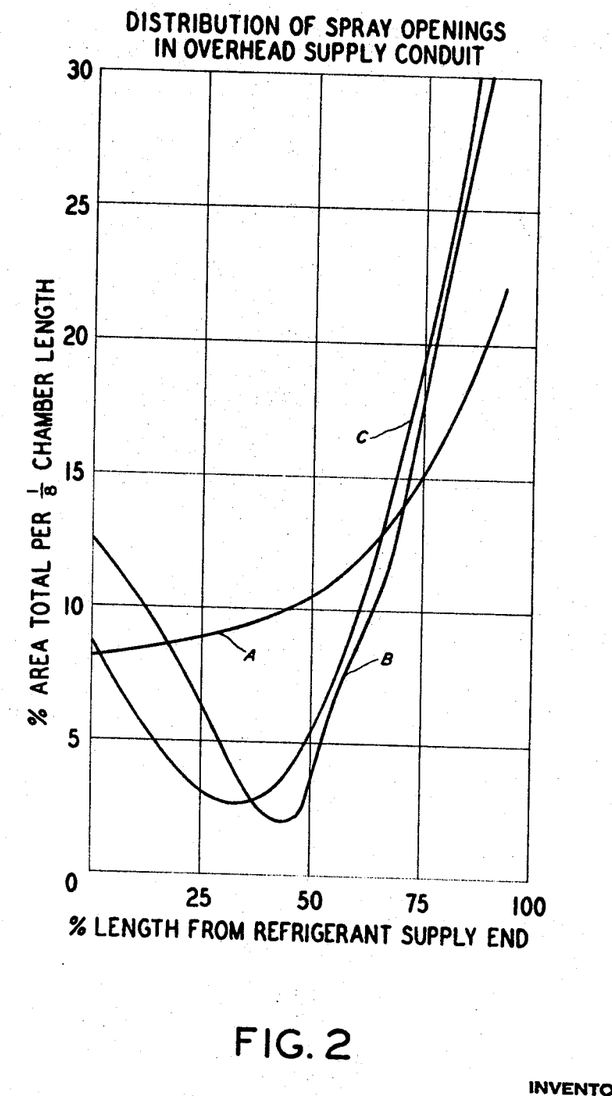
FIG. 2 is a graph showing the relationship between various spray hole spacings in an overhead spray or supply conduit and the longitudinal end-to-end distance in the perishable product storage chamber.

The preferred distribution of spray openings in the overhead conduit extending the entire end-to-end length of the storage chamber is illustrated in the FIG. 2 graph. For purposes of this graph, the storage chamber may be considered as divided into eight longitudinal sections. The ordinate is the percent of the total orifice area or spray opening area in the conduit for each ⅛-length section, and the abscissa is the percent of the total overhead conduit length measured from the conduit fluid inlet or supply end. In this particular assemblies the liquid-vapor was introduced at the storage chamber front end for curve A, and at the chamber rear end for curves B and C. The overhead conduit for curve A was ⅜-inch I.D. brass pipe and the spray openings were 1/16-inch diameter holes drilled in the pipe at 20-degree angles below the horizontal on consecutively alternating sides of the pipe. The overhead conduits for curves B and C were ¾-inch O.D. aluminum with similar drilled holes.

Curve A of FIG. 2 is for the conventional distribution of spray openings in the overhead spray or supply conduit having the liquid-vapor feed point at the front end with progressively closer hole spacings proceeding from the front to the chamber rear end. Curves B and C of FIG. 2 show typical distributions of spray openings for overhead supply conduits for which a portion of the liquefied gas is prevaporized upstream of the conduit according to my invention. Curve B shows an intermediate spray opening distribution and curve C is the preferred spray opening distribution for storage chambers. It will be apparent from inspecting the shapes of curves B and C that the greatest spray opening area is preferably provided in that portion of the conduit farthest removed from the liquid-vapor feed point, a smaller spray opening area is provided in the portion adjacent to the feed point, and the least spray opening area is in the middle zone or section of the chamber. For example, in the first one-eighth length of the overhead conduit (from the refrigerant supply end), the average portions of the total opening area are as follows: curve $A=8.3\%$, curve $B=11.2\%$, and curve $C=6.9\%$. In the fourth length of the conduit (between 37.5% and 50% of the overhead conduit length), the average portions of the total spray opening area are as follows: curve $A=9.8\%$, curve $B=2\%$, and curve $C=3.5\%$. In the last length of the conduit (between 87.5% and 100% of the overhead conduit length), the average portions of the total spray opening area are as follows: curve $A=22.2\%$, curve $B=32.8\%$, and curve $C=36.8\%$.

Figure 3:
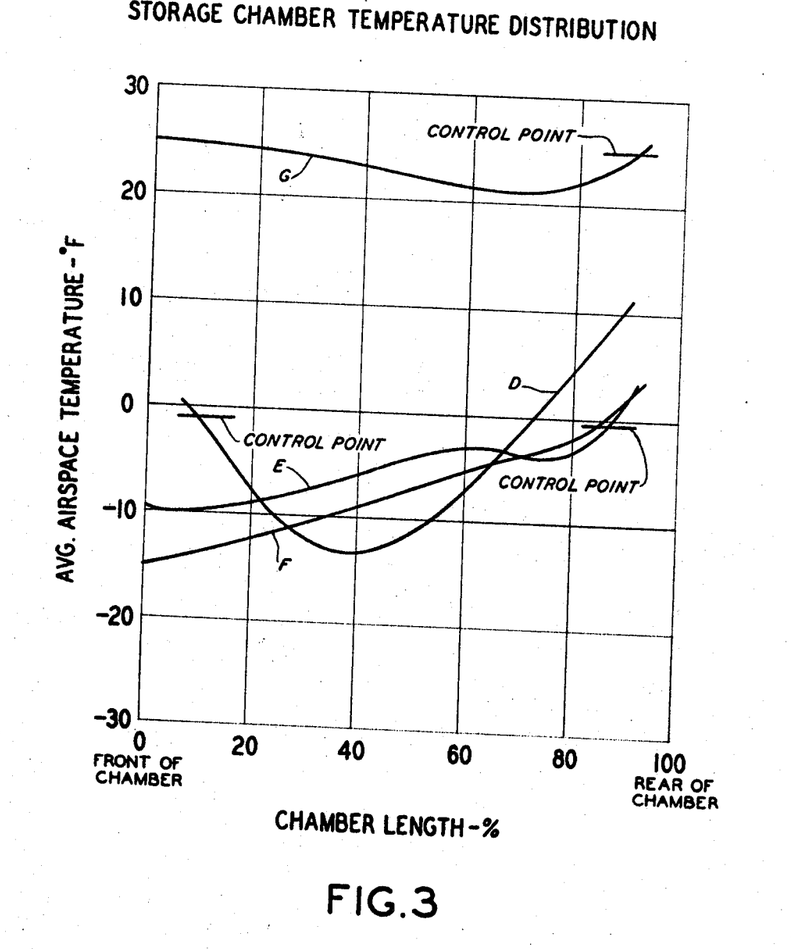
FIG. 3 is a graph showing the relationship between average airspace temperature and the longitudinal end-to-end distance in the storage chamber for various temperature control points.

The difficulty in achieving uniform temperature distribution using the conventional liquid nitrogen overhead spray system for refrigerating storage chambers is illustrated in the FIG. 3 graph, along with the superior temperature distribution attainable with this invention. In each instance a rear door type storage chamber was used and liquid nitrogen was sprayed through spaced 1/16-inch diameter openings in a single ¾-inch O.D. aluminum overhead conduit. The openings were oriented 20° below horizontal as for the FIG. 10 apparatus. In each instance a thermostat sensing bulb element was used to monitor and control the liquid nitrogen flow from the storage container to the overhead spray conduit at a selected control point temperature ("CP"). This bulb was placed near the chamber front end for certain tests and near the rear end for other tests as illustrated in FIG. 3. In the conventional system on which curve D is based, the liquid nitrogen was discharged directly from the liquid container at pressure of about 20 p.s.i.g. and −300° F., and passed into the overhead spray conduit at the storage chamber rear end with not greater than about 3% vaporization. The spray opening distribution along the conduit was identical to curve A of FIG. 2. The control point temperature, defined as the air space temperature existing in the vicinity of the thermostat bulb, was about 0° F. It is apparent from curve D that considerable deviation occurred from the control point in the various sections of the storage chamber. For example, the temperature dropped to about −13° F. near the center section and rose to about +10° F. near the far or rear end of the storage chamber.

Figure 5:
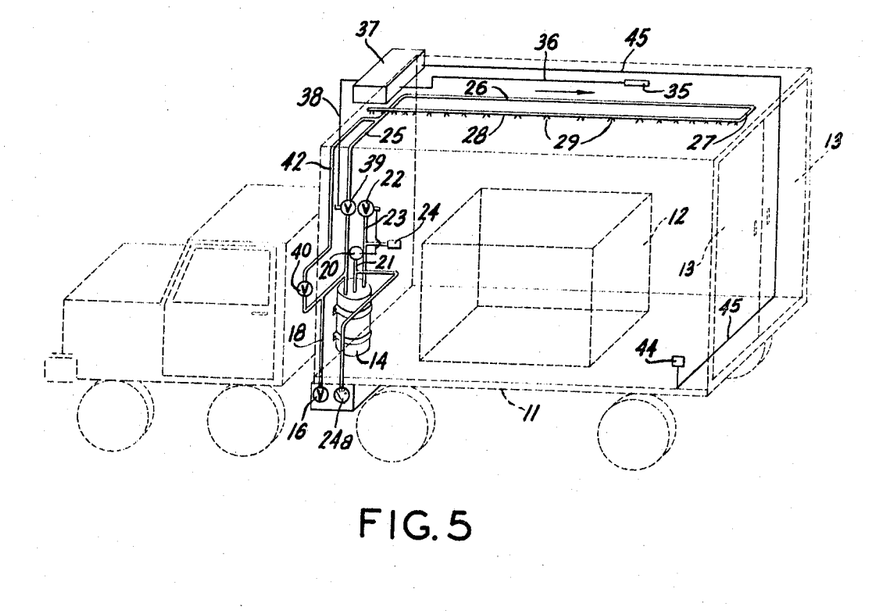
FIG. 5 is a schematic flowsheet of novel apparatus suitable for practicing the in-transit refrigeration method of the invention.

In contrast, curves E, F and G in FIG. 3 show the improvement attainable by vaporizing a sufficient portion of the dispensed liquid nitrogen to form liquid-vapor containing at least about 8% vapor, and spraying this fluid through openings having the cross-sectional area distribution shown in curve B of FIG. 2. The liquid was partially vaporized in an uninsulated conduit extending from the front to the rear end of the storage chamber by heat from the storage chamber environment, and thereafter introduced to the overhead spray conduit at the chamber rear end as illustrated in FIG. 5. The liquid-vapor supply conduit was ¾-inch diameter in curves E and G and 1-inch diameter in curve F with the control point at about 0° F. for E and F. For curve G the control point was +25° F. In each instance the average airspace temperature of curves E, F and G varied only about 4° F. from the control point in the rear portion of the storage chamber, which was a distinct improvement from the conventional rear end airspace temperature deviation of up to 10° F. (see curve D). However, there was little improvement in such airspace temperature deviation in the storage chamber front end for curves E and F as compared to curve D.

This limitation was overcome in another preferred embodiment of the invention, in which the liquid-vapor is mixed together after the partial vaporization step and before the steps of spraying the liquid-vapor as a multiplicity of discrete streams into the various zones of the storage chamber. I believe that the partial vaporizing step alone results in a stratified fluid flow pattern within the overhead spray conduit, whereby the vapor portion surrounds a liquid core extending along the first portion of the conduit nearest the feed end. To prevent such annular or stratified flow and provide a uniform flow pattern with relatively constant density fluid along the entire overhead spray conduit, mixing or turbulence promotor means are preferably used within the entire length of this conduit.

Figure 4:
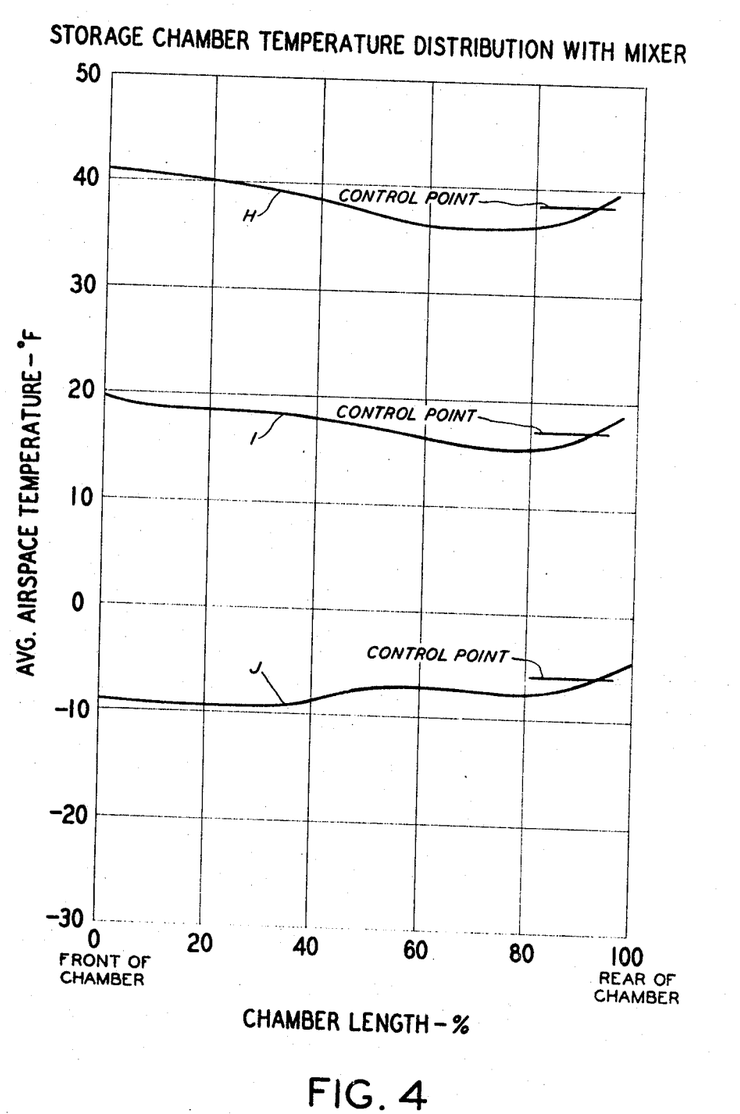
FIG. 4 is a graph similar to FIG. 3 illustrating the uniformity of storage chamber air space temperature achieved by the present invention.
Figures 7, 8, 9, 10:
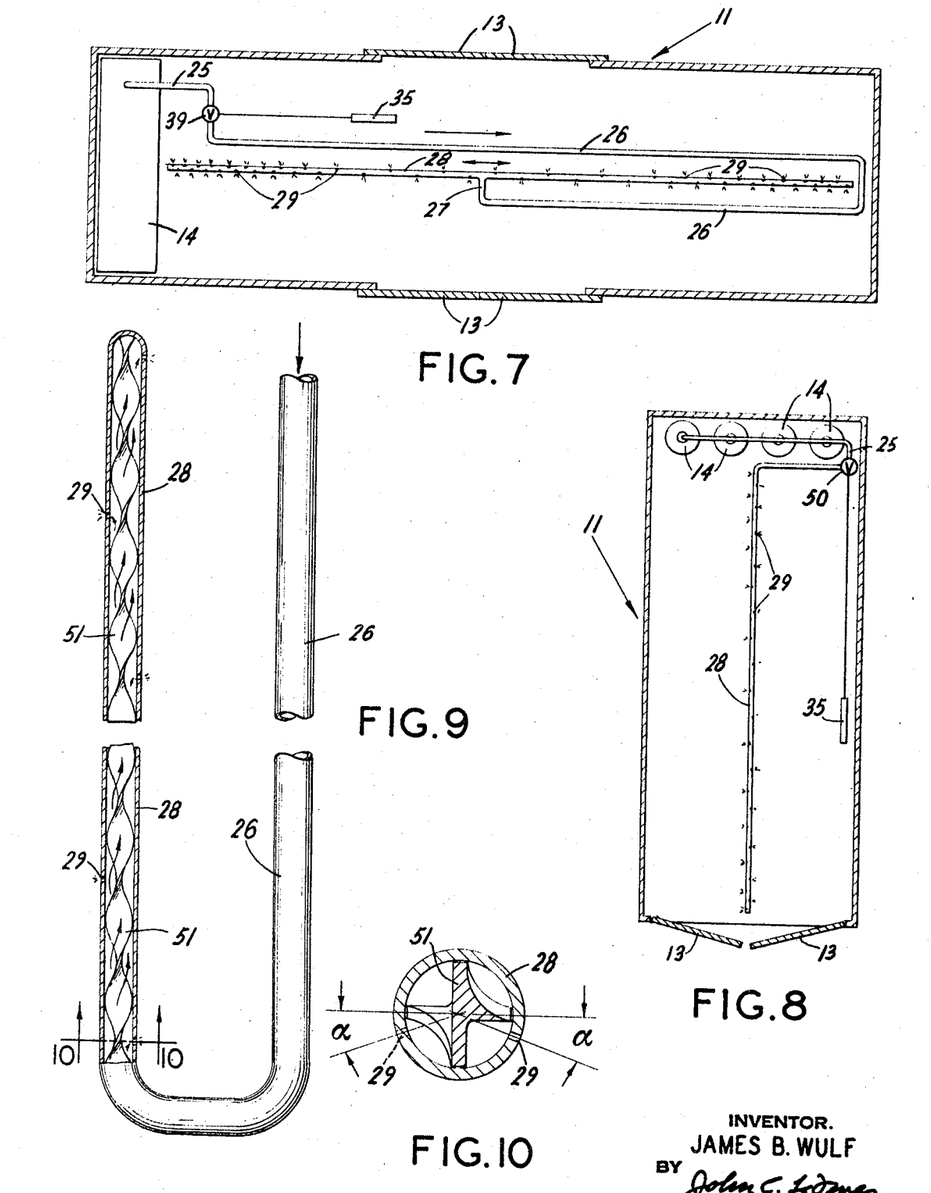
FIG. 7 is a schematic plan view looking downwardly on a modified in-transit refrigeration system of this invention in which the liquid-vapor feed conduit is joined to the longitudinal mid-point of the spray conduit and the access doors are in the chamber middle section.
FIG. 8 is a schematic plan view looking downwardly on another in-transit refrigeration system of this invention in which a controlled portion of the liquid refrigerant is vaporized by throttling.
FIG. 9 is a longitudinal view taken in partial cross-section of an overhead conduit containing flow turbulence means for mixing the liquid and vapor phases of the refrigerant.
FIG. 10 is an end view taken in cross-section of the FIG. 9 conduit along the line 10—10.

A suitable mixer may comprise a strip of thin flat material twisted into a spiral shape and inserted into the overhead spray conduit, with the wave length of the spiral being about 12–15 inches (see FIG. 9). Using this spiral-shaped mixer, the further improved temperature distribution of FIG. 4 was obtained using a 1-inch O.D. heat exchanger tube extending the chamber length and a ¾-inch O.D. overhead spray conduit with ¹⁄₁₆-inch diameter openings spaced as shown in curve C of FIG. 2. As shown for FIG. 4, for control points of about 37° F. (curve H), 16° F. (curve I), and −7° F. (curve J), the average airspace temperature deviation was not over about 3° F. at any point within the storage chamber.

To most effectively distribute the low-boiling liquefied gas in spray form within the storage chamber, the liquid is preferably provided at temperatures corresponding to a vapor pressure above about 10 p.s.i.g. with the entire liquid and vapor substantially in equilibrium in the storage container. As described in copending application Ser. No. 328,356 filed Dec. 5, 1963 now U.S. Patent No. 3,287,925 in the names of J. J. Kane et al. and incorporated herein to the extent pertinent, the liquid is saturated under these conditions and may be controllably dispensed from the container by this vapor pressure. The liquid may be charged into the storage container in the saturated state or may be charged thereto in the subcooled condition. In the latter event, the stored liquid may be warmed by any convenient means, as for example gas pressure building, atmospheric heat inleak or a combination therof.

FIG. 5 illustrates an apparatus embodiment of the invention in which a mobile thermally insulated storage chamber 11 is provided for perishable products 12 stacked therein. This chamber 11 may be of standard construction for typical mobile refrigerated chambers, e.g. reinforced aluminum siding outer walls, plywood panelled inner walls and asbestos insulating material between the two walls. The chamber need not be air-tight, as access means such as rear doors 13 are needed for insertion and removal of the perishable products. Although the primary function of storage chamber 11 is to refrigerate the perishable products, the preferred liquefied gases such as nitrogen also control the atmosphere within the chamber and provide an inert blanket surrounding the product 12.

In this manner its respiration rate is slowed down and the deterioration rate retarded, exclusive of the refrigeration.

A double-walled mobile thermally insulated container 14 is associated with storage chamber 11 for storing pressurized low-boiling liquefied gas having a boiling point at atmospheric pressure below about −112° F. The construction of such containers is well-known and is for example depicted in Loveday et al. U.S. Patent No. 2,951,348. Container 14 is depicted within storage chamber 11 but it also may be positioned outside this chamber. Container 14 includes an outer shell completely surrounding an inner storage vessel to form an evacuable insulation space therebetween. This space is preferably filled with an efficient solid thermal insulating material, as for example alternate layers of radiation-impervious barriers such as aluminum foil separated by low conductive fibrous sheeting as for example glass fibers. This particular highly efficient insulation is described in U.S. Patent No. 3,007,596 to L. C. Matsch. Other suitable insulating materials include layers of aluminum coated-polyethylene terephthalate. Alternatively, powdered insulation material as for example perlite or finely divided silica may be employed.

To remove gases accumulating in the evacuated insulating space, an adsorbant material as for example calcium zeolite A, or a gettering material as for example powdered barium may be provided therein to retain a high level of insulating quality.

Low-boiling liquefied gases which are suitable for use as refrigerants in the present invention are those which have a boiling point at atmospheric pressure below about −20° F. Examples of such liquefied gases are liquid air, liquid argon, liquid carbon dioxide, liquid helium, and liquid nitrogen. Liquid nitrogen is preferred because of its inertness and relative ease of separation from air. While the subsequent discussion refers specifically to nitrogen, it is to be understood that all of the aforementioned gases are suitable.

The storage vessel within storage container 14 is filled with liquefied nitrogen by means well known to the prior art, such as for example connecting a source of liquefied nitrogen stored at above atmospheric pressure to filling valve 16, and opening valve 16 thereby allowing the transfer of liquefied nitrogen from a storage tank through conduit 18 into container 14. If the liquid nitrogen is stored at a pressure below the operating pressure of container 14, the transfer conduit 18 from the liquid source would be connected to a suitable pump and, usually, additional heat would be added to the pressurized liquid before transferring it into container 14. As previously indicated, the liquid nitrogen is preferably charged into container 14 and stored therein at saturated conditions and at temperatures corresponding to a vapor pressure above 10 p.s.i.g. with the entire liquid and vapor substantially in equilibrium.

A trycock and vent system, extending into the inner storage vessel of container 14, is opened prior to the start of the filling operation and is employed to indicate when container 14 is full. At this point, valve 16 and the trycock and vent system are simultaneously closed. The latter is preferably closed immediately upon cessation of the filling operation in order that the vapor pressure within container 14 does not fall below the initial operating pressure. Because there is no appreciable amount of heat inleak to the inner storage vessel of container 14 due to the high quality of the insulation, the stored liquid nitrogen can only be dispensed by the vapor pressure of at least 10 p.s.i.g. created at the time of filling in a preferred embodiment. Thus, any leakage through the trycock and vent system caused by not closing it quickly enough will result in a vapor pressure, within container 14, below the initial operating pressure, and, hence, the complete utilization of the refrigerating effects of the stored liquefied nitrogen will not be as readily accomplished.

It has been found that at operating pressures below about 10 p.s.i.g. the rate of liquid nitrogen withdrawal from container 14 markedly decreases, thereby resulting in a much increased time period necessary to cool down storage chamber 11. Insofar as an upper pressure limit is concerned, at pressures above about 100 p.s.i.g. the inherent lag characteristics of presently known temperature sensing elements will not permit adequate control of the liquid nitrogen withdrawal. Before a temperature-dependent control system can be activated to terminate the withdrawal of liquid nitrogen under pressures above about 100 p.s.i.g. the temperature of the storage chamber atmosphere would probably drop excessively, perhaps to about −50° F. or lower. Such low temperatures are ordinarily not required and may be intolerable for some stored products; also the establishment of such temperatures results in a waste of the liquid nitrogen refrigerating effects. For these reasons, the preferred operating pressure range of this mobile refrigeration system is between about 10 p.s.i.g. and 100 p.s.i.g.

During the filling operation, the vapor pressure is likely to exceed the initial operating pressure. If this occurs, pressure sensitive switch 20, which communicates with the vapor space within container 14 by conduit 21, will activate vapor phase valve 22 thereby allowing excess vapor to escape from within container 14 through conduit 23 into storage chamber 11. Under normal operating conditions, once the filling operation is completed, the vapor pressure within container 14 will not exceed the desired operating pressure since the heat leak through the aforementioned insulation that would cause this pressure build-up is negligible. However, if the pressure does build up excessively beyond the initial operating pressure, suitable relief means are provided, which are generally indicated at 24, to allow the excess vapor to escape if valve 22 is unable to relieve the pressure quickly enough. Pressure gauge 24a is connected to conduit 21 thereby visually indicating the operating pressure within container 14.

Liquid discharge conduit 25 is joined at one end to liquid storage container 14 and at the other end to heat exchanger means 26 having sufficient surface area for vaporization of at least 8% of the inlet fluid. The latter as depicted in FIG. 5 comprises a tube extending substantially the entire length of the storage chamber 11 from front to rear end thereof, and positioned within the upper portion of such chamber. The necessary heat is supplied to heat exchanger 26 from the surrounding ambient gas. Liquid-vapor conduit 27 is also provided with a first end joined to the discharge end of heat exchanger conduit 26. As illustrated, conduit 27 is positioned at the rear end of perishable product chamber 11. Spray conduit 28 is joined to a second end of liquid-vapor conduit 27 and is arranged and positioned within the upper portion of storage chamber 11. Conduit 28 extends substantially the entire length of storage chamber 11 and is provided with openings 29 spaced along such length. These openings 29 discharge a multiplicity of discrete liquid-vapor streams at above atmospheric pressure into the storage chamber to uniformly cool the entire chamber below atmospheric temperature. Although the spray conduit 28 and heat exchanger 25 are shown located near the center of the storage chamber 11 in the transverse direction, they may be located anywhere in the upper portion of this chamber such as near one side wall.

In some instances, use of thermal insulation around spray conduit 28 is preferred and even its use around heat exchange conduits 26 and 27 is warranted to improve their overall performance and prevent freezing of the adjacent stored product during and after operation of the system. A good quality insulation would be used on the spray conduit 28 to substantially prevent heat transfer to the refrigerant therein and thus restrict fluid density change in this conduit. A lesser quality thermal insulation would be employed on the heat exchange conduit 26 and connecting conduit 27 so as to permit sufficient heat input for vaporization of the desired portion of liquid and to simultaneously maintain an outside temperature above freezing to prevent frost formation on the outer surface and freezing of the adjacent stored product.

Liquefied gas flow control means are also provided including a temperature sensing element 35 as for example a bulb positioned within the storage chamber 11. This bulb 35 is connected by signal transmitting means 36 to temperature controller 37, and signal transmitting means 38 provides communication between the controller and liquid phase valve 39 in liquid discharge conduit 25. The flow control means may be electrically or pneumatically operated as described in detail in the abovementioned Kane et al. U.S. Patent No. 3,287,925. Should there be a failure in the electrical or pneumatic network, provisions for directing liquid nitrogen into storage chamber 11 have been afforded. Emergency by-pass valve 40 can be manually opened thus allowing liquid nitrogen to flow through liquid discharge conduit 25 into branch conduit 42 and thence into heat exchange conduit 26 at the juncture with liquid discharge conduit 25.

The refrigeration system operates as follows:

When the temperature of the storage chamber 11 atmosphere rises above a predetermined level—e.g. 0° F. for frozen food or about 35° F. for fresh produce, as sensed by element 35, a signal from controller 37 is transmitted through conduit 38 to open valve 39. Liquid nitrogen then flows from storage container 14 through conduit 25 to heat exchange conduit 26, where a sufficient portion of the discharged liquid is vaporized to form liquid-vapor containing at least 8% vapor. The partial vaporization occurs by virtue of heat exchange with the warmer environment gas surrounding the conduit 26 within chamber 11. The resulting cooled environment gas in turn serves to uniformly cool the various storage zones or sections from the front to the rear end of chamber 11. The resulting liquid-vapor is fed to spray conduit 28 which preferably contains flow turbulence means for through mixing of the refrigerant fluid. The liquid-vapor mixture is sprayed through openings 29 for in-transit refrigeration of perishable product 12, the openings being preferably spaced more closely to each other in the front and rear end sections than in the chamber middle section. It will be apparent from the foregoing discussion that refrigeration is dispersed within the storage chamber both by the spray and by convection from the cold surfaces of heat exchange conduit 26, liquid-vapor conduit 27 and spray conduit 28.

Whenever access is gained to storage chamber 11 by rear end doors 13, ambient temperature air will rapidly diffuse throughout storage chamber 11 thereby displacing the cold chamber atmosphere and raising the temperature of the storage chamber atmosphere. To prevent temperature controller 37 from opening valve 39 under these circumstances, an overriding mechanism, switch 44, is opened and disconnects the temperature controller circuit. Switch 44 may be manual or automatic, and communicates with temperature controller 37 through pneumatic or electrical signal transmitting conduit 45. Because this refrigeration system is capable of rapid and economical cooling of the storage chamber atmosphere from ambient temperature down to any desired low temperature commensurate with the properties of liquid nitrogen, e.g. 0° F., it is satisfactory to temporarily inactivate the system during the exposure of the chamber's interior to the ambient atmosphere.

Figure 6:
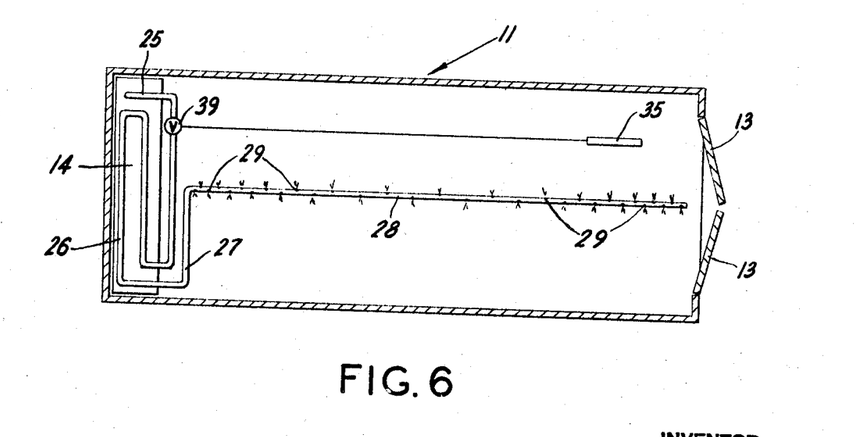
FIG. 6 is a schematic plan view looking downwardly on a modified form of the FIG. 5 apparatus.

FIGS. 6, 7 and 8 illustrate various perishable product chamber-liquid storage container-heat exchanger-spray conduit assemblies which may be constructed according to this invention. Other configurations could also be used. Corresponding items in these drawings have been assigned the same reference numerals used in FIG. 5.

The FIG. 6 embodiment employs rear end door access means 13 as does the FIG. 5 construction, but the heat exchanger 26 joining liquid discharge conduit 25 comprises serpentine coils located at the storage chamber front end. Also, the liquid-vapor conduit 27 joins the discharge end of heat exchanger 26 at the chamber front end, and in turn connects with the spray conduit at this end. Another distinctive feature of FIG. 6 is that the liquid storage container 14 is rectangular instead of cylindrical.

In the FIG. 7 embodiment the access means are doors 13 on each side in the middle section of the perishable product storage chamber 11. The latter may for example resemble a railway box car in appearance, suitable for long hauls. The heat exchanger 26 extends from one end to the other end of the chamber 11 and then returns halfway to the middle section for connection with conduit 27 and juncture with liquid-vapor spray conduit 28. The fluid thus divides and flows from the middle in opposite directions toward either end of chamber 11 for discharge through spaced spray openings 29 in conduits 28. As in the other illustrated embodiments, openings 29 are preferably spaced more closely to each other in the front end and rear end sections than the middle section of the storage chamber for more uniform spray distribution therein.

FIG. 8 illustrates an in-transit refrigeration assembly employing multiple liquefied gas storage containers 14 which are joined by interconnecting piping to supply a continuous source of liquid until all containers are empty. The containers may for example be interconnected in the series flow manner described and claimed in U.S. Patent No. 3,241,580 to H. W. Lichtenberger et al.

Another feature of FIG. 8 is the use of control valve 50 for partially vaporizing the liquid in discharge conduit 25. This is accomplished by throttling such liquid from a first higher super-atmospheric pressure to a second lower super-atmospheric pressure. The resulting liquid-vapor enters spray conduit 28 at the chamber front end and flows toward the rear end for spraying through spaced conduit openings 29. For saturated liquid nitrogen refrigerant, about 22 p.s.i.g. pressure in storage containers 14 is required to generate 8% vapor at atmospheric pressure. However, at least 5 p.s.i.g. is usually required in conduit 28 to spray the liquid-vapor into the chamber 11, so that a container pressure of about 28 p.s.i.g. is needed to provide at least 8% nitrogen vapor at the spray conduit inlet.

FIGS. 9 and 10 illustrate a section of the FIG. 5 heat exchange-spray conduit assembly with flow turbulence means 51 positioned within spray conduit 28. Such means may comprise a strip of thin flat material twisted into a spiral shape of 12–15 inches wave length and inserted into conduit 28. In one assembly constructed according to the FIG. 5 embodiment, the 1-inch O.D. heat exchange conduit 26 is 36 feet long and communicates with a 3/4-inch O.D. liquid spray conduit 28 which is 36 feet long. The two conduits extend the end-to-end length of a perishable product storage chamber and are spaced about 2 3/4-inches apart, center-to-center. The chamber itself is 40 feet long, 8 feet wide and 8 feet high. The liquid nitrogen storage container has a capacity of 2,500 lbs. and is set to discharge the liquid under a pressure of 15 p.s.i.g.

Other flow turbulence means may be used instead of spiral strip 51. For example, suitably spaced indentations or dimples could be provided in the side walls of spray conduit 28.

FIGS. 9 and 10 also show typical positions for spray openings 29. They should be oriented at an angle α0°–30° below the horizontal, and preferably about 20° in spaced relation on alternating sides of the conduit 28 centerline. With this orientation the spray is directed outwardly and downwardly towards the storage chamber side walls from the centrally positioned conduit 28. The spray openings are sized and spaced so that the quantity of refrigerant discharged through each opening is sufficient to absorb the heat load imposed at that location. As previously indicated, the heat loads at the ends of the chamber are greater than in the middle section, and I have found the most effective method for matching the refrigeration with the heat load is to space the spray openings more closely together at the chamber end sections.

In the previously referenced preferred spray conduit assembly constructed according to the FIG. 5 embodiment, the spray openings are all 1/16-inch diameter. Considering the 36 foot long spray conduit as divided into three sections of selected lengths, there are five openings in the first or rear section comprising 25% of the length, three openings in the second or middle section comprising 30% of the length, and twenty-seven openings in the last or front section comprising 45% of the spray conduit length. The hole spacings for this particular assembly are shown graphically as curve C in FIG. 2.

The improved performance obtained using this invention was verified by a series of field tests made using a prototype refrigeration system installed in a highway trailer constructed generally as illustrated by FIG. 5. A load of fresh boxed lettuce (674 cartons) was shipped on railroad flatcar from Salinas, Calif. to Cincinnati, Ohio, in a liquid nitrogen refrigerated trailer equipped with a 1-inch O.D. uninsulated heat exchanged conduit and a 3/4-inch O.D. uninsulated spray conduit equipped with fluid mixing means as illustrated in FIGS. 9 and 10. The spray conduit had 1/16-inch diameter holes spaced in accordance with FIG. 2, curve C. The lettuce was loaded at 33°–34° F. temperature and the controller was set to maintain 35° F. at the top of the storage space. After 7 days shipping time, the trailer was unloaded in Cincinnati, Ohio. Lettuce temperatures were 34°–38° F. and the condition of the lettuce was good. This temperature deviation from the control point was much less than previously observed when using a liquid nitrogen refrigeration system without the prevaporization or mixing features, and the produce was received in much better condition.

Although preferred embodiments of the invention have been described in detail, it is contemplated that modifications of the method and apparatus may be made and that some features may be employed without others, all within the spirit and scope of the invention. For example, this refrigerating system may also be used with stationary equipment.

As an alternative, the desired uniform temperature distribution within the storage chamber could be achieved by varying the opening sizes along the spray header length. More specifically, to achieve substantially the same total spray opening area as in the aforementioned 36-foot long spray conduit described as having all 1/16-inch diameter spray openings, the middle section may be provided with five (instead of three) openings of 3/64-inch diameter size (instead of 1/16-inch diameter). The hole spacings for each of these three sections can be obtained from curve C of FIGURE 2.

As a further alternative, the desired uniform temperature distribution could be achieved by using a larger number of relatively small openings in the end sections and a small number of relatively larger openings in the middle section. Again, using the 36-foot spray conduit for illustration, nine openings of 3/64-inch diameter could be spaced in the first (rear) section, forty-eight openings of 3/64-inch diameter could be spaced in the third (front) section, with the number and size of openings in the middle section remaining the same (three openings of 1/16-inch diameter). Again, the particular hole spacings within each of these three sections may be determined by reference to curve C of FIGURE 2.

What is claimed is:

1. A method for the preservation of perishable products comprising the steps of providing pressurized low-boiling liquefied gas having a boiling point at atmospheric pressure below about −20° F. in a thermally insulated storage container associated with a thermally insulated storage chamber, said chamber enclosing a series of horizontally spaced zones extending the chamber length with adjacent zones contiguously associated with each other including a middle zone and end zones; controllably dispensing pressurized liquefied gas from the container; vaporizing a sufficient portion of the dispensed liquid so as to form liquid-vapor containing between about 8% and 50% vapor by weight; spraying said liquid-vapor at above atmospheric pressure as a multiplicity of discrete streams into each of said zones of the storage chamber so as to uniformly cool said zones and maintain the entire chamber in a selected temperature range below ambient.

2. A method for the in-transit preservation of perishable products comprising the steps of providing pressurized low-boiling liquefied gas having a boiling point at atmospheric pressure below about $-20°$ F. in a mobile thermally insulated storage container associated with a mobile thermally insulated storage chamber, said chamber enclosing a series of horizontally spaced zones extending the chamber length with adjacent zones contiguously associated with each other and including a middle zone and end zones; controllably dispensing pressurized liquefied gas from the container; vaporizing a sufficient portion of the dispensed liquid so as to form liquid-vapor containing between about 8% and 50% vapor by weight; spraying said liquid-vapor at above atmospheric pressure as a multiplicity of discrete streams into each of said zones of the storage chamber and in greater flow rate per unit length of chamber in said end zones than in said middle zone so as to uniformly cool said zones and maintain the entire chamber in a selected temperature range below ambient.

3. A method according to claim 1 in which said dispensed liquid is partially vaporized by heat from the storage chamber environment.

4. A method according to claim 1 in which said dispensed liquid is partially vaporized by throttling from a first higher super-atmospheric pressure to a second lower superatmospheric pressure.

5. A method according to claim 1 in which said dispensed liquid is partially vaporized by heat exchange with environment gas in each zone of said storage chamber so as to uniformly cool such chamber by the cooled environment gas.

6. A method according to claim 1 in which said liquid-vapor is mixed after said vaporizing.

7. A method for the in-transit preservation of perishable products comprising the steps of providing pressurized low boiling liquefied gas having a boiling point at atmospheric pressure below about $-20°$ F. and at temperature corresponding to a vapor pressure above about 10 p.s.i.g. with the entire liquid and vapor substantially in equilibrium in a mobile thermally insulated storage container associated with a mobile thermally insulated storage chamber, said chamber enclosing a series of horizontally spaced zones extending the chamber length with adjacent zones contiguously associated with each other including a middle zone and end zones; controllably dispensing pressurized liquefied gas from the container by said vapor pressure; vaporizing a sufficient portion of the dispensed liquid by heat exchange with environment gas in each zone of said storage chamber so as to uniformly cool such chamber by the cooled environment gas and form liquid-vapor containing between about 8% and 50% vapor; mixing said liquid-vapor to form a uniform density liquid-vapor mixture; spraying said liquid-vapor mixture at above atmospheric pressure as a multiplicity of discrete streams into each of said zones of the storage chamber and in greater flow rate per unit length of chamber in said end zones than in said middle zone so as to uniformly cool said zones and maintain the entire chamber in a selected temperature range below ambient.

8. In a system for the in-transit preservation of perishable products, an apparatus comprising in combination: a mobile thermally insulated storage chamber for said perishable products; a mobile thermally insulated container associated with the storage chamber for storing pressurized low-boiling liquefied gas having a boiling point at atmospheric pressure below $-20°$ F., the longitudinal axis of said storage chamber being horizontally aligned with end sections separated by a middle section; a liquid discharge conduit joined at one end to the liquefied gas container; heat exchanger means joined to the other end of said liquid discharge conduit for vaporizing a sufficient portion of the discharge liquid to form liquid-vapor containing at least about 8% vapor; a liquid-vapor conduit having a first end joined to the discharge end of said heat exchanger means; spray conduit means joined to a second end of said liquor-vapor conduit being arranged and positioned within the upper portion of said storage chamber and extending substantially the entire length thereof with openings spaced along the length for discharging a multiplicity of discrete liquid-vapor streams at above atmospheric pressure into the storage chamber to uniformly cool the entire chamber below ambient temperature, said spray conduit openings being spaced more closely to each other in said end sections than said middle section; and liquefied gas flow control means comprising a temperature sensing element positioned within said storage chamber, a control valve operably interposed in said liquid discharge conduit being connected to said temperature sensing element to be responsive to the storage chamber temperature as sensed by such element.

9. Apparatus according to claim 8 in which said heat exchanger is positioned within the upper portion of said storage chamber and extends substantially the entire length thereof.

10. Apparatus according to claim 8 in which said spray conduit contains flow turbulence means therein.

11. Apparatus according to claim 8 in which thermal insulating material is provided around said spray conduit means.

12. In a system for the in-transit preservation of perishable products, an apparatus comprising in combination; a mobile thermally insulated storage chamber for said perishable products having horizontally aligned end sections separated by a middle section; a mobile thermally insulated container associated with the storage chamber for storing pressurized low-boiling liquefied gas having a boiling point at atmospheric pressure below $-20°$ F.; a liquid discharge conduit joined at one end to the liquefied gas container; heat exchanger means joined to the other end of said liquid discharge conduit for vaporizing a sufficient portion of the discharged liquid to form a liquid-vapor containing at least about 8% vapor; a liquid-vapor conduit having a first end joined to the discharge end of said heat exchanger means; spray conduit means joined to a second end of said liquid-vapor conduit being arranged and positioned within the upper portion of said storage chamber and extending substantially the entire length thereof and containing flow turbulence means therein for mixing said liquid-vapor, said spray conduit means having openings, spaced along its length with closer spacings in the chamber end sections than the middle section for discharging a multiplicity of discrete liquid-vapor streams at above atmospheric pressure into the storage chamber at greater flow into said end sections than said middle section to uniformly cool the entire chamber below ambient temperature, said spray conduit means being provided with thermal insulation material; and liquefied gas flow control means comprising a temperature sensing element positioned within said storage chamber, a control valve operably interposed in said liquid discharge conduit being connected to said temperature sensing element to be responsive to the storage chamber temperature as sensed by such element.

13. In a system for the in-transit preservation of perishable products, an apparatus comprising in combination: a mobile thermally insulated storage chamber for said perishable products; a mobile thermally insulated container associated with the storage chamber for storing pressurized low-boiling liquefied gas having a boiling point at atmospheric pressure below $-20°$ F., the longitudinal axis of said storage chamber being horizontally aligned with end sections separated by a middle section; a liquid discharge conduit joined at one end to the liquified gas container; heat exchanger means joined to the other end of said liquid discharge conduit for vaporizing a sufficient portion of the discharged liquid to form liquid-vapor containing at least about 8% vapor; a liquid-vapor conduit having a first end joined to the discharge end of said heat exchanger means; spray conduit means joined to a second end of said liquid-vapor conduit being arranged and positioned within the upper portion of said storage chamber and extending substantially the entire length thereof with openings spaced along the length for discharging a multiplicity of discrete liquid-vapor streams at above atmospheric pressure into the storage chamber to uniformly cool the entire chamber below ambient temperature, said spray conduit openings being of larger individual cross-sectional area and spaced to provide larger total cross-sectional area in said end sections than said middle section; and liquefied gas flow control means comprising a temperature sensing element positioned within said storage chamber, a control valve operably interposed in said liquid discharge conduit being connected to said temperature sensing element to be responsive to the storage chamber temperature as sensed by such element.

14. Apparatus according to claim 13 in which said spray conduit contains flow turbulence means therein.

15. In a system for the in-transit preservation of perishable products, an apparatus comprising in combination: a mobile thermally insulated storage chamber for said perishable products; a mobile thermally insulated container associated with the storage chamber for storing pressurized low-boiling liquefied gas having a boiling point at atmospheric pressure below −20° F., the longitudinal axis of said storage chamber being horizontally aligned with end sections separated by a middle section; a liquid discharge conduit joined at one end to the liquefied gas container; heat exchanger means joined to the other end of said liquid discharge conduit for vaporizing a sufficient portion of the discharged liquid to form liquid-vapor containing at least about 8% vapor; a liquid-vapor conduit having a first end joined to the discharge end of said heat exchanger means; spray conduit means joined to a second end of said liquid-vapor conduit being arranged and positioned within the upper portion of said storage chamber and extending substantially the entire length thereof with openings spaced along the length for discharging a multiplicity of discrete liquid-vapor streams at above atmospheric pressure into the storage chamber to uniformly cool the entire chamber below ambient temperature, said spray conduit openings being of smaller individual cross-sectional area and spaced to provide larger total cross-sectional area in said end sections than said middle section; and liquefied gas flow control means comprising a temperature sensing element positioned within said storage chamber, a control valve operably interposed in said liquid discharge conduit being connected to said temperature sensing element to be responsive to the storage chamber temperature as sensed by such element.

References Cited

UNITED STATES PATENTS

| | | | |
|---|---|---|---|
| 2,479,840 | 8/1949 | Johnson et al. | 62—239 |
| 2,479,866 | 8/1949 | Rosebaugh | 62—45 |
| 3,197,973 | 8/1965 | Ronnenberg et al. | 62—467 |
| 3,241,329 | 3/1966 | Fritch et al. | 62—239 |
| 3,255,597 | 6/1966 | Carter | 62—239 |
| 3,281,075 | 10/1966 | Smyers | 62—239 |
| 3,287,925 | 11/1966 | Kane et al. | 62—514 |
| 3,293,877 | 12/1966 | Barnes | 62—514 |
| 3,308,630 | 3/1967 | Fritch et al. | 62—52 |
| 3,316,726 | 5/1967 | Panliukonis | 62—55 |

LLOYD L. KING, *Primary Examiner.*

U.S. Cl. X.R.

62—52, 239

PO-1050
(5/69)

UNITED STATES PATENT OFFICE
CERTIFICATE OF CORRECTION

Patent No. 3,446,028  Dated May 27, 1969

Inventor(s) James B. Wulf

It is certified that error appears in the above-identified patent and that said Letters Patent are hereby corrected as shown below:

Column 14, line 59, the word -- rates -- should be inserted immediately after the word "flow".

SIGNED AND
SEALED

NOV 4 1969

(SEAL)
Attest:

Edward M. Fletcher, Jr.
Attesting Officer

WILLIAM E. SCHUYLER, JR.
Commissioner of Patents